(12) United States Patent
Cerwin et al.

(10) Patent No.: US 7,372,031 B2
(45) Date of Patent: May 13, 2008

(54) SYSTEM AND METHOD FOR SENSITIVE PHOTON DETECTION

(75) Inventors: Stephen A. Cerwin, Mico, TX (US); David B. Chang, Tustin, CA (US)

(73) Assignee: Southwest Research Institute, San Antonio, TX (US)

( * ) Notice: Subject to any disclaimer, the term of this patent is extended or adjusted under 35 U.S.C. 154(b) by 63 days.

(21) Appl. No.: 11/384,574

(22) Filed: Mar. 20, 2006

(65) Prior Publication Data
US 2006/0243909 A1    Nov. 2, 2006

Related U.S. Application Data

(60) Provisional application No. 60/665,065, filed on Mar. 24, 2005.

(51) Int. Cl.
*G01J 1/00* (2006.01)
(52) U.S. Cl. .................................. 250/336.1
(58) Field of Classification Search .............. 250/336.1
See application file for complete search history.

(56) References Cited

U.S. PATENT DOCUMENTS 6,310,352 B1   10/2001   Gross et al.

FOREIGN PATENT DOCUMENTS

| GB | 2228318 A | * | 8/1990 |
|----|-----------|---|--------|
| WO | WO 90/08946 | | 8/1990 |

OTHER PUBLICATIONS

Komiyama, et al., "A single-photon detector in the far-infrared range", 403 Nature (Jan. 27, 2000), pp. 405-407.
Karasik, et al., "Photon-noise-limited direct detector based on disorder-controlled electron heating", 87(10) J. Appl. Phys (2000), pp. 7586-7588.
Gol'tsman et al., "Picosecond superconducting single-photon optical detector", 79(6) Appl. Phys. Lett. (2001), pp. 705-707.
Becker et al., "Detectors for High-Speed Photon Counting", http://www.beckerhicki.de/pdf/Spcdetecl.pdf.
Optical Fiber Amplifiers, (S. Sudo ed. 1997), Artech House, Inc. (1997).
Brown, "Team's FETs Communicate with Single Photons", EE Times (Jan. 29, 2002).

* cited by examiner

*Primary Examiner*—David P. Porta
*Assistant Examiner*—Marcus H Taningco
(74) *Attorney, Agent, or Firm*—Winstead Sechrest & Minick

(57) ABSTRACT

A sensitive photon detection system generates an electronic photon sensor signal as a K factor times a number N photons per unit time. The system is configured by combining a separate optical amplifier with a gain factor K1 with a photo detector with a gain factor K2 such that K may be realized as the product of K1 and K2. The values of K1 and K2 are chosen to meet a predetermined K while optimizing a signal quality of the photon sensor signal. The optical amplifier may be preceded by a photon gathering device and/or a light chopping device to further optimize system performance. Further, the photon sensor signal may be further processed analog circuitry or may be digitized and processed using digital signal processing to generate an enhanced photon sensor signal with enhanced signal quality by adding gain and/or bandwidth limiting.

32 Claims, 8 Drawing Sheets

SYSTEM AND METHOD FOR SENSITIVE PHOTON DETECTION

PRIORITY BENEFIT AND CROSS REFERENCE TO RELATED APPLICATIONS

This application is related to the following commonly owned now abandoned U.S. patent application: Provisional Application Ser. No. 60/665,065, "Sensitive Photon Detector System", filed Mar. 24, 2005, and claims the benefit of its earlier filing date under 35 U.S.C. § 119(e).

TECHNICAL FIELD

The present invention relates in general to systems for detecting the numbers and the energy of particles and in particular to systems for detecting photons.

BACKGROUND INFORMATION

Photon detection is widely used in applications as varied as process monitoring, optical communications, spectroscopy, remote sensing, quantum cryptography, and tracking. A simple means for improving the sensitivity of photon detection is desired and would result in an increased range of applications with photon detection systems with improved performance.

There has been much work directed at improving the sensitivity of photon detectors. For example, Chappell Brown in the Jan. 29, 2002 EE Times describes the use of FET's with quantum dots to permit the detection of single photons. This work has been done at the Toshiba Cambridge Research Laboratory by a team under the direction of Andrew Shields. In this approach, a two dimensional electron gas is created in the channel of a field effect transistor. The channel is formed at the surface of the FET's heterojunction (e.g., between GaAs and aluminum gallium arsenide). This electron gas is very sensitive to the field on the transistor gate. Instead of a conventional gate on top of the channel, an array of indium phosphide quantum dots is deposited. When a photon hits a quantum dot, it creates an electron and a hole which in turn perturb the two dimensional electron gas, creating a small change in current that can be detected.

As another example, S. Komiyama, O. Astafiev, V. Antonov, T. Kutsuwa, and H. Hirai, Nature 403, 405 (2000) describe a photon detector that can detect photons in the far infrared part of the spectrum. It also uses a quantum dot that is 7000 Angstroms across. The quantum dot is placed in a strong magnetic field that splits the electron energy levels in the dot into two energy levels. An incoming infrared photon can be absorbed by the dot if its energy is equal to the gap between the energy levels. Once the electron is excited by the photon, it leaps onto the terminal of a single electron transistor where it is detected. A 0.1 mm$^2$ device can count one photon every ten seconds. It must be cooled to 1° K in order to detect far infrared photons.

B. S. Karasik, W. R. McGrath, M. F. Gershenson, and A. V. Sergeev, J. App. Phys. 87, 7586 (2000) describe a detector capable of detecting even longer wavelength photons. A millimeter wavelength photon is detected by changing the state of a one micron sized micro-bridge made of a disordered superconducting film. The photon heats the film, causing it to change from a superconducting to conducting state. The photon is detected by this change in resistivity. Like the infrared detector, this detector also requires extensive cooling (in this case, to 0.1° K).

A somewhat similar detector for visible and infrared photons has been developed by G. N. Gol'tsman, O. Okunev, G. Chulkove, A, Lipatov, A, Semenov, K. Smirnov, B. Voronov, and A, Dzardanov, Ap. Phys. Lett. 79 705 (2001). It also uses a superconducting/conducting transition in a micro-bridge made of an ultra thin NbN film. The device is maintained at 4.2° K.

In addition to these relatively new sensitive detectors, there are many more common detectors based on dynode type photomultipliers, single or multi-channel photomultipliers, and avalanche diodes. Some of these are reviewed in the recent article by Wolfgang Becker and Axel Bergmann, "Detectors for high speed photon counting," which may be accessed at http://www.becker hicki.de/pdf/Spcdetectl.pdf.

Optical amplifiers based on stimulated emission are well known. Stimulated emission can occur in matter in a variety of forms, both fluid and solid. Optical fiber amplifiers are becoming more important now for optical communications [See, e.g., S. Sudo, ed., Optical Fiber Amplifiers. Boston: Artech House, Inc. (1997)]. Optical amplifiers are well described in the U.S. Patent Office subclass 359/333, 349. In these subclasses, optical amplification is described under the headings: Raman or Brillouin process, free electron, bistable, correction of deleterious effects, mode locked, particular active medium (e.g., crystal, plasma, fluid, etc.), particular pumping type (e.g., electrical, optical, nuclear, magnetic, etc.), particular resonator cavity (e.g., scanning, confocal or folded mirrors, etc.), multiple pass, and beam combination or separation.

Photon detection is a relatively mature field with both good analytical and experimental support. However, the state of the art is pushed in efforts to increase the sensitivity of detection. Noise and voltage breakdown problems can arise when detectors are made to operate at their limits. In some cases, extreme cooling is required. In other cases, the sensitive detectors can be quite bulky. Devices based on nanotechnology hold considerable promise, but this technology is still in the relatively early stages of development.

Typical high gain photon detectors have gains on the order of $10^6$-$10^8$, with pulse response widths of 1 nanosecond. Each input photon yields an output current pulse of peak amplitude on the order of a milliampere. The table below (taken from Wolfgang Becker and Axel Bergmann, "Detectors for high speed photon counting," that can be accessed at http://www.becker hickl.dcjvdf/spcdetectl.pdf.) shows some typical values for a standard photomultiplier tube (PMT), a fast photomultiplier tube, and a multi-channel PMT:

TABLE 1

| PMT | Gain | FWHM | $I_{SER}$ | $V_{SER}$ | $I_{max}$ (cont) |
|---|---|---|---|---|---|
| Standard | $10^7$ | 5 ns | 0.32 mA | 16 mV | 100 µA |
| Fast PMT | $10^7$ | 1.5 ns | 1 mA | 50 mV | 100 µA |
| MCP PMT | $10^6$ | 0.36 ns | 0.5 mA | 25 mV | 0.1 µA |

In Table 1, $I_{SER}$ denotes the peak current for a "single electron response", and $V_{SER}$ denotes the average SER peak voltage when the output is terminated with 50Ω. $I_{max}$ is the maximum permitted continuous output current of the PMT. The Table shows that quite large gains are possible with typical tubes, and that the response time of the tubes is very small and on the order of nanoseconds.

Avalanche photodiodes can also be made quite sensitive if they are operated close to or even slightly above the breakdown voltage. In these devices, the electron-hole pairs generated by the input photons initiate an avalanche breakdown in the diode. Active or passive quenching circuits are used to restore normal operation after an avalanche occurs. These devices have high quantum efficiency in the visible and near-infrared. PIN diodes can be used to detect X-ray photons. Because of their energy, X-ray photons create so many electron-hole pairs in the diode that the resulting charge pulse can be detected by an ultra-sensitive charge amplifier. These devices, however, only have time resolutions in the microsecond range. They can distinguish between different energy photons by the amount of charge generated by each.

Transit time spread and timing jitter occurs in these high gain detectors. For a PMT, there are three major causes: emission at the photocathode, multiplication in the dynode system, and timing jitter in the subsequent electronics. High efficiency semiconductor-type photo-cathodes (GaAs, GasAsP, and InGaAs) introduce transit time spreads of the order of 100 to 150 psec. This is due to the random velocities and random directions of the emitted electrons. The same type of transit time spread is introduced by the dynodes. The timing jitter in the discriminator at the input of a photon counter can also introduce a timing spread. Transit time spread also occurs in avalanche photodiodes, due to the different depth in which the photons are absorbed. The passive quenching circuit can also introduce a spread if the reverse voltage has not completely recovered from the previous avalanche breakdown.

Noise occurs associated with the random thermal emission from the cathode (with the dark current increasing by a factor of 3 to 10 for each 10° C. increase in temperature). Also, most detectors have an increased probability to produce a dark current pulse in a time interval of hundreds of nanoseconds to some microseconds following the detection of a photon.

Solid state detectors have quite respectable noise figures. The sensitivity is often described in terms of the parameter D*, defined as the reciprocal of the noise equivalent power (NEP) of the detector referred to unit area and a 1 Hz electrical bandwidth:

$$D^* = (A\Delta f)^{1/2}/NEP$$

where A is the detector area and $\Delta f$ is the electrical bandwidth. Typical commercially available detectors have D*s in the range $10^8$-$10^{12}$ watt$^{-1}$-cm-sec$^{1/2}$. In general, noise can be decreased by operating at reduced gain.

Optical amplification based on stimulated emission has developed rapidly as a result of the rise of optical communication devices. Stimulated emission is enhanced over spontaneous emission in materials that contain a meta-stable state. Thus, ordinarily the spontaneous lifetime of an excited state is on the order of some tens of nanoseconds. However, in some materials, this spontaneous lifetime can be of the order of microseconds to a few milliseconds; in which case the excited state is called a meta-stable state. In that case, the likelihood of a spontaneous transition occurring rather than the desired stimulated emission is small. For stimulated emission to occur, a population inversion has to be created in the host medium. This can be achieved either with optical pumping or electrically (e.g., collisional excitation due to current flow in a discharge).

For the fiber amplifiers which are finding increasing use in optical communications, typical pump lasers include Er, Pr, Nd, and Tm. Pump band gain coefficients can be in the range of 2-6 dB mW. The theoretical limit on the noise figure (degradation of S/N between input and output for an optical amplifier) is 3 dB. For comparison, amplifier gains of 30-40 dB are easily obtained. The noise figure of an optical fiber amplifier actually decreases for a fixed pump length as the gain is increased. [S. Sudo, ed., *Optical Fiber Amplifiers*. Boston: Artech House, Inc. (1997)].

Depending on the application, an optical collection system may be used in front of the optical amplifier to either narrow the field of acceptance of the system or broaden it. For example, for optical communications, it may be desirable to have a very narrow acceptance angle. This will serve also to minimize background photon noise. For broad area monitoring, on the other hand, it may be desirable to have a wide acceptance angle.

A large aperture collection lens may be used to increase the gathered intensity. However, a limit on the largeness of the aperture may be set by the acceptance angles in the subsequent optical system. The acceptance angle must be larger than the beam divergence at any point in the system. The divergence angle in the subsequent optics is subject to the conservation of the transverse action $\Delta\theta$ D, where D is the diameter of the optical beam at any point in the optical system and $\Delta\theta$ is the associated angular divergence of the beam at that point. If an optical fiber amplifier is used, for example, the allowable divergence of the beam at the fiber end will be determined by the numerical aperture of the fiber. It is understood that a lens system may be replaced by a mirror system or a combined lens/mirror system.

Another method for noise and offset reduction is the chopping technique. Chopping is a modulation technique which shifts the spectra of low frequency stationary processes at multiples of chopper frequency out of the band of interest. The chopping may be achieved with well-known techniques, e.g., mechanically (e.g., rotating wheels), electromechanically (e.g., electrically controlled mirror orientation), by means of electrically controlled crossed polarizer's, etc. As one application, this type of gating may be used with pulsed light sources to reduce the effective background or to distinguish between different signal components.

If a "photon event" comprises emissions from gunfire and chemical explosions (non-nuclear) there is a problem in the detection of radio frequency spectrum. This type of emission is black-body and increases with frequency. At optical frequencies (visible and infrared) the signals are large and are readily detectable by conventional optical detectors. However, optical frequencies cannot penetrate dense clouds, smoke, or foliage. Lower frequencies, down into the radio and microwave frequency bands, can penetrate these obstructions, enabling detection at light speed and offering the possibility of radio localization. But at radio frequencies, antennas are used to capture energy and the antennas suffer from severe limitations. The wavelength-squared dependence on capture area of an antenna means that power collected diminishes with the square of frequency. If an attempt is made to recapture the frequency dependent losses with gain in the antenna, the radiation pattern becomes very directive, requiring prior knowledge of the source location in order to point the antenna, limiting usefulness as a detector. So lower frequencies provide the required penetration but are problematic to detect because they require antennas. As frequency increases, the black body radiation increases with frequency, but the capture area of the antenna decreases with frequency-squared. A sensitive photon detector that does not have a frequency dependent capture area would circumvent the problem of a frequency dependent antenna.

While many techniques have been employed separately to accomplish photon collection, optical amplification, and photon detection, no single system has incorporated all the necessary elements to achieve a photon detection system that is optimized for sensitivity, size, signal to noise, etc. and yet configured with off the shelf components.

There is, therefore, a need for a sensitive photon detector that combines the best features of optical amplifiers with those of state of the art photon detectors to configure a photon detector system that uses off the shelf components, offers smaller size, and provides better signal to noise than is achievable with a single component photon detector.

SUMMARY OF THE INVENTION

A sensitive photon detector (SPD) system generates a photon sensor signal proportional to the number N photons per unit time received at the input and amplified with a desired gain factor K. The SPD system is configured using a cascade of an optical amplifying system and a photon detection system. The optical amplifying system receives N input photons per unit time and generates M output photons per unit time where M is equal to N times an optical gain factor K1. The photon detection system receives the M photons per unit time and generates P electrons per unit time where P is equal to M times a photon detection gain factor K2. The overall gain factor K is the product K1 times K2. The particular values of K1 and K2 are adjusted to maximize the signal to noise ratio of the voltage produced by the P electrons per unit time flowing in an electronic circuit while keeping the product of K1 times K2 substantially equal to the desired value K. A wider variety of types of optical amplifier systems may be employed since the required gain K1 of the system is much less than the desired gain K. Likewise, a wider variety of photon detection systems may be used since again the gain K2 is much less than K. In this manner, each of the two amplifying elements may be operated for overall optimum signal to noise, may be operated at more reliable operating points, and may be selected from system components that form an overall smaller SPD system that would be attainable if the desired gain K was accomplished in a single amplifying system. The electrons per unit time result in a current that may be converted to a voltage potential for further electronic signal processing including further amplification.

In other embodiments of the present invention, optical photon gathering elements such as lenses may be employed to increase the numbers of input photons per unit time and to improve overall system performance parameters.

In yet another embodiment of the present invention an optical chopping device is used to interrupt the input photons to generate a pulsed photonic input that results in a pulsed voltage signal whose pulse frequency is directly related to the chopping frequency. In this manner, the electronic signal processing may be further optimized by band limiting processed signals to harmonics of the chopping frequency.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
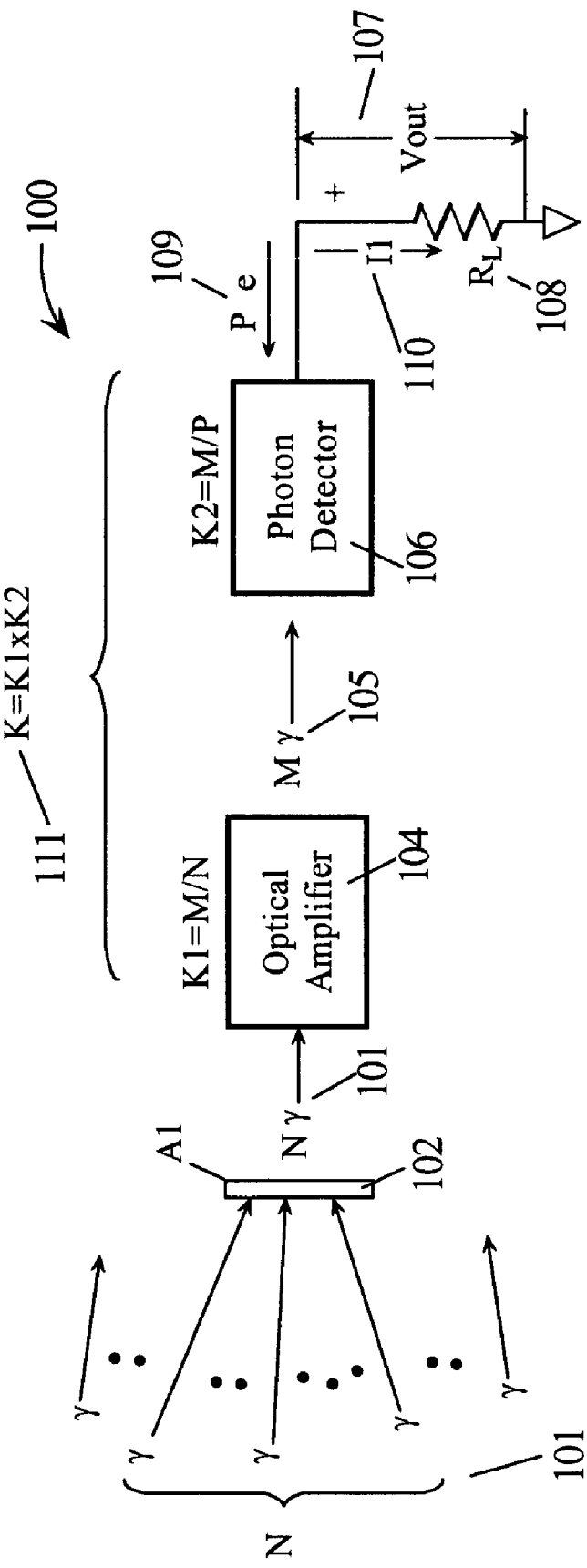
FIG. 1 is a block diagram of a system for generating a photon sensor signal according to embodiments of the present invention.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views. In the following components may be referred to as devices, systems or simply by the function name, for example photon detector. These components, in general, may be composed of multiple elements where the overall all performance (e.g., gain) is realized as the combined performance of the elements (e.g., total gain as the product of gains of its elements). An optical amplifier receives light as an input and generates light as an output. A photon detector receives photons as an input and generates electrons as an output. Typically the electrons per unit time as a current are converted to a voltage for further processing or use.

FIG. 1 is a block diagram of a system for generating a photon sensor signal (SPS) 100 according to embodiments of the present invention wherein an photon sensor signal 107 is generated that is proportional to the number N photons 101 impinging on an area A1 102 and coupled to optical amplifier 104. Optical amplifier 104 produces M photons 105 in response to the N photons 101. The gain K1 of optical amplifier 104 is defined as the ratio M/N. The M photons 105 are coupled to the input of a photon detector 106 that converts input photons to output electrons. The P output electrons 109 result in current I 110 that generates photon sensor signal 107 as a voltage when it flows through load resistor RL 108. The desired system gain K corresponding to the ratio of the photon sensor signal 107 to N photons per unit time impinging on area A1 102 is partitioned into gain K1 and K2. In embodiments of the present invention, the optical amplifier 104 and the photon detector 106 are selected with individual gains K1 and K2 to provide a predetermined value for system gain K while also providing the best trade offs for each device to realize overall system performance parameters. The following detailed descriptions of FIGS. 2-5 refer to system performance parameters that may include but are not limited to system cost, system size and portability, system bandwidth, signal to noise ratio, and system sensitivity.

Figure 2:
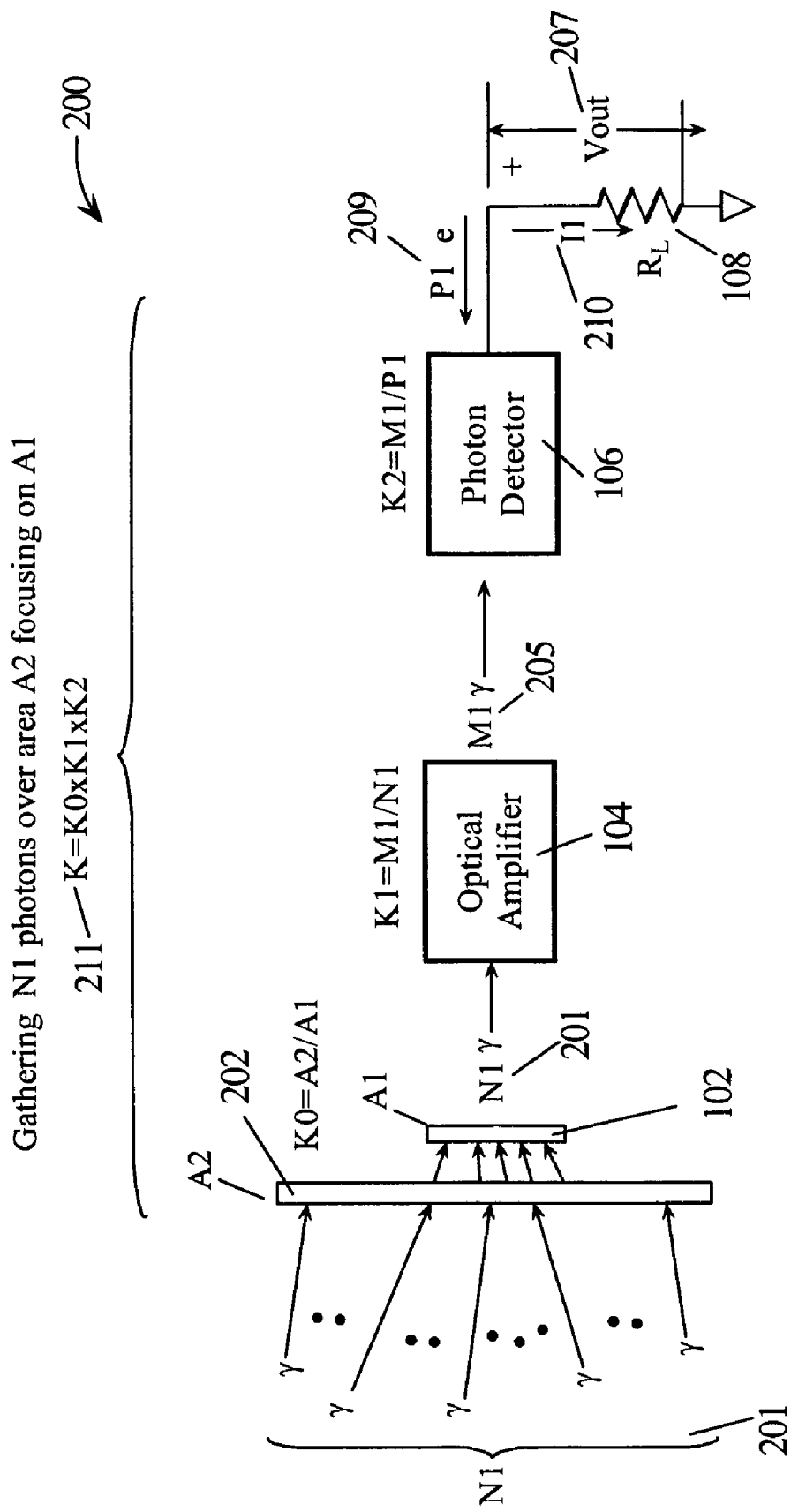
FIG. 2 is a block diagram of a system for generating a photon sensor signal according to embodiments of the present invention wherein photons from a large area are focused on a smaller area of an optical amplifier.

FIG. 2 is a block diagram of an SPS 200 according to embodiments of the present invention wherein a photon collection lens system is used to focus N1 photons 201 per unit time generated by a photon event over an area A2 202 so that they impinge on the area A1 102. The photon collection system has a gain K0 defined as the ratio of area A2 202 to area A1 102. Since more photons from a photon event may be focused on area A1 102, then the gain requirements for other system components may be relaxed allowing for better overall system performance parameters. Optical amplifier 104 now produces M1 photons 205 in response to the N1 photons. The gain K1 of optical amplifier 104 is defined as the ratio M1/N1. The M1 photons 205 are coupled to the input of a photon detector 106 that converts input photons to output electrons. The P1 output electrons 209 result in current I 210 that generates a photon sensor signal 207 as a voltage when it flows through load resistor RL 108. The desired system gain K representing the photon sensor signal 207 generated in response to N input photons per unit time is partitioned into gains K0, K1, and K2. In this embodiment of the present invention, the gain of the optical lens system allows the gains K1 and K2 to be further refined and selected to optimize the selection of the optical amplifier 104 and the photon detector 106 to provide the best trade offs for each device based on system performance parameters as stated above. N1 input photons 201 are now captured for the photon event instead of the N input photons 101 as shown in FIG. 1.

Figure 3:
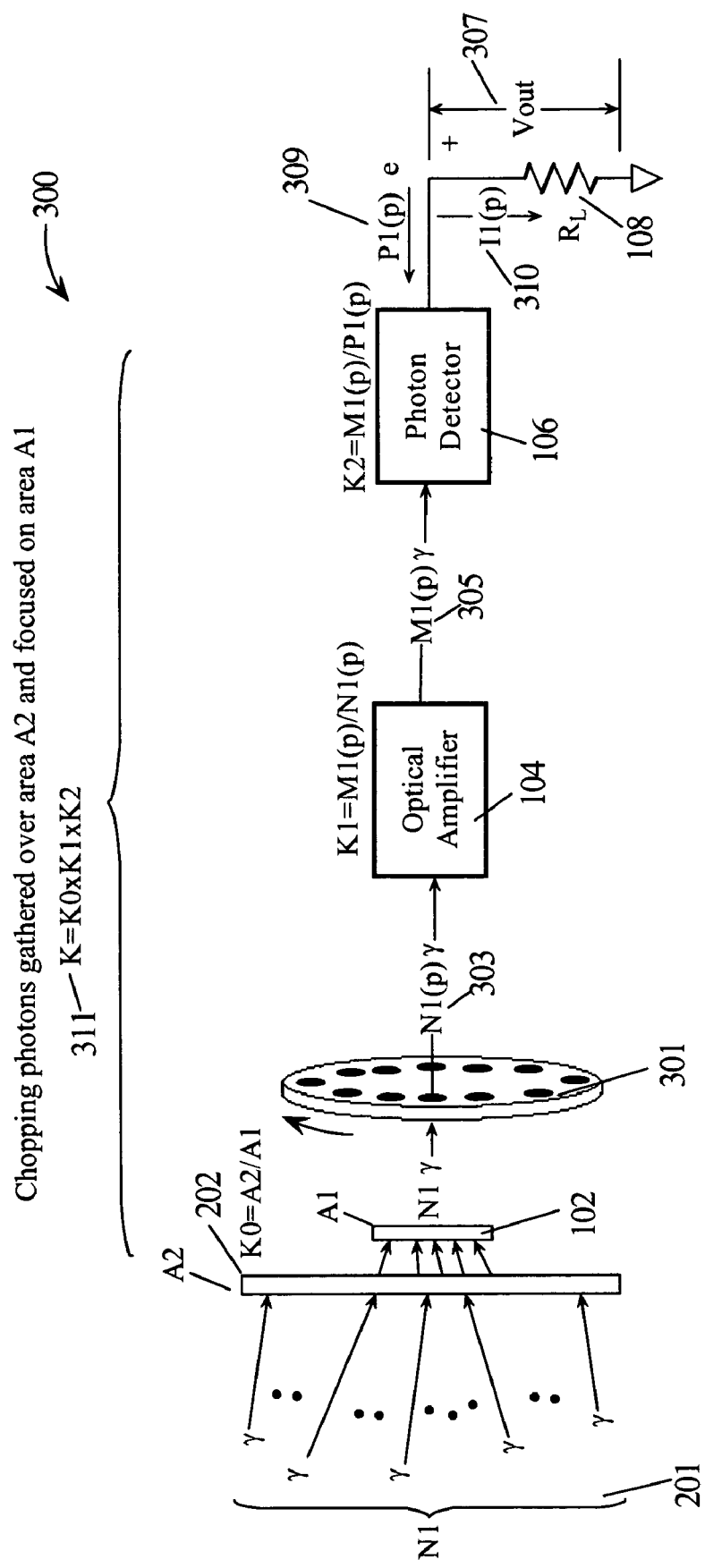
FIG. 3 is a block diagram of a system for generating a photon sensor signal according to embodiments of FIG. 2 with the addition of an optical chopping element to improve signal to noise.

FIG. 3 is a block diagram of an SPS 300 according to embodiments of the present invention wherein a photon collection system is used to focus N1 photons 201 per unit time impinging on area A2 202 onto area A1 102. The photon collection system has a gain K0 defined as the ratio of area A2 202 to area A1 102. Additionally, a photon chopping device 301 is used to interrupt the N1 photons 203 generating N1(p) pulsed photons 303 per unit time. The photon chopping process generates a pulsed signal with a frequency content that allows additional noise reduction techniques to be employed. Optical amplifier 104 produces M1(p) pulsed photons 305 per unit time. The gain K1 of optical amplifier 104 is defined as the ratio M1(p)/N1(p). The M1(p) photons 305 per unit time are coupled to the input of a photon detector 106 that converts the pulsed input photons to pulsed output electrons. The P1(p) pulsed output electrons 309 result in pulsed current I 310 that generates a pulsed voltage as photon sensor signal 307 when it flows through load resistor RL 108. The desired system gain K representing the photon sensor signal 307 generated in response to N1 photons per unit time impinging on area A2 102 is partitioned into gains K0, K1, and K2. In this embodiment of the present invention, the gain of the optical lens system allows the gains K1 and K2 to be further refined and selected to optimize the selection of the optical amplifier 104 and the photon detector 106 to provide the best trade offs for each device based on system performance parameters. Chopping the photon stream N1 203 allows the pulsed output voltage 307 to be processed to reduce background offset photons in the input and to improve signal to noise by using band limited filtering.

Figure 4A:
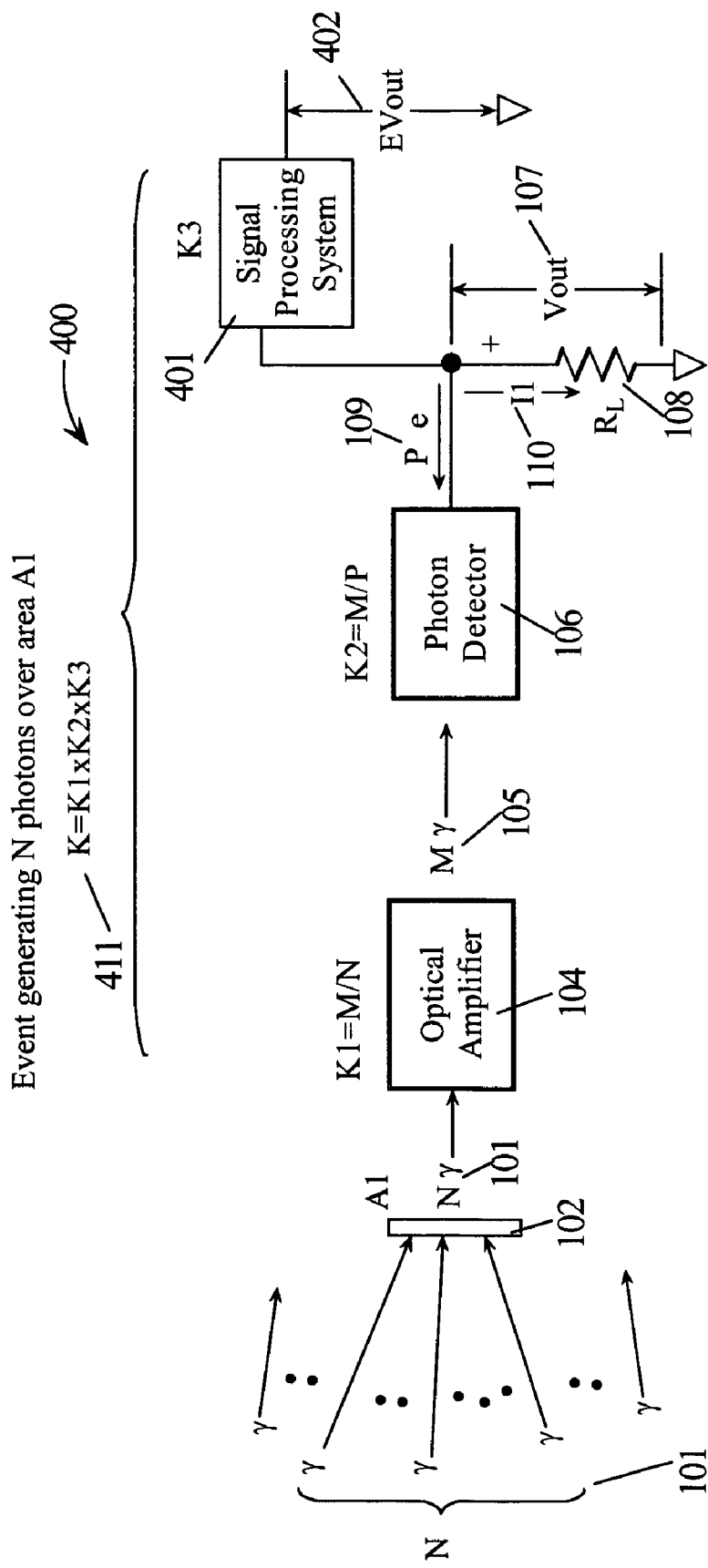
FIG. 4A is a block diagram of a system for generating a photon sensor signal according to embodiments of FIG. 1 with the addition of a signal processing system to enhance the electronic output signal.

FIG. 4A is a block diagram of an SPS 400 according to embodiments of the present invention wherein photon sensor signal 107 voltage is generated that is proportional to the number N photons 101 impinging on an area A1 102 and coupled to optical amplifier 104. Optical amplifier 104 produces M photons 105. The gain K1 of optical amplifier 104 is defined as the ratio M/N. The M photons 105 per unit time are coupled to the input of a photon detector 106 that converts input photons to output electrons. The P output electrons 109 result in current I 110 that generates a photon sensor signal 107 as a voltage when it flows through load resistor RL 108. Photon sensor signal 107 is further processed by signal processing system 401 which includes an additional gain factor K3. The desired system gain K, representing an enhanced photon sensor signal 402 generated in response to N photons per unit time impinging on area A1 102, is partitioned into gains K1, K2 and K3. In embodiments of the present invention, the gains K1, K2 and K3 are chosen to optimize the selection of the optical amplifier 104 and the photon detector 106 to provide the best trade-offs for each device based on system performance parameters. Signal processing device 401 may be an analog system or a digital signal processing system that combine frequency selectivity along with a gain K3 to optimize the enhanced photon sensor signal 402 produced in response to the N photons 101 impinging on area A1 102 per unit time.

Figure 4B:
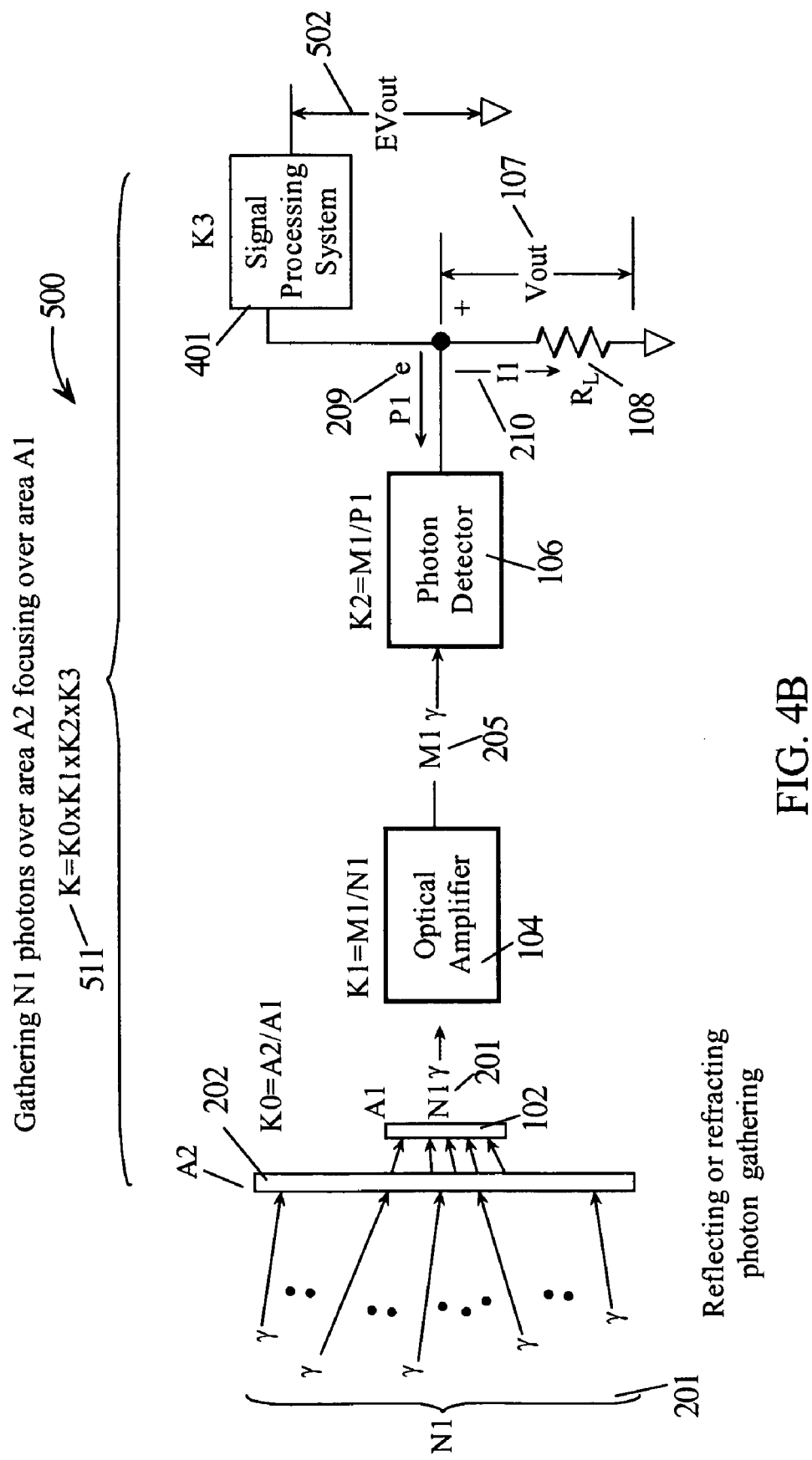
FIG. 4B is a block diagram of a system for generating a photon sensor signal according to embodiments of FIG. 2 with the addition of a signal processing system to enhance the electronic output signal.

FIG. 4B is a block diagram of an SPS 500 according to embodiments of the present invention wherein photon sensor signal 207 as a voltage generated that is proportional to the number N1 photons 201 impinging on an area A2 202. The N1 photons 201 are focused, using a lens system, onto area A1 102 and coupled to optical amplifier 104. The photon collection system has a gain K0 defined as the ratio of area A2 202 to area A1 102. Optical amplifier 104 produces M1 photons 205. The gain K1 of optical amplifier 104 is defined as the ratio M1/N1. The M1 photons 205 per unit time are coupled to the input of a photon detector 106 that converts input photons to output electrons. The P1 output electrons 209 result in current I 210 that generates photon sensor signal 207 as a voltage when it flows through load resistor RL 108. Photon sensor signal 207 may be further processed by signal processing system 501 to produce enhanced photon sensor signal 502. Signal processing system 501 includes an additional gain factor K3. The desired system gain K representing enhanced photon sensor signal 502 generated in response to N1 photons 201 per unit time focus onto area A1 102 is partitioned into gains K0, K1, K2 and K3. In embodiments of the present invention, the gains K1, K2 and K3 are selected to optimize the selection of the optical amplifier 104 and the photon detector 106 to provide the best trade-offs for each device based on system performance parameters. Signal processing device 401 may be an analog system or a digital signal processing system that combine frequency selectivity along with gain factor K3 to optimize enhanced photon sensor signal 502 produced in response to the N1 photons 201 impinging on area A1 102 per unit time.

Figure 4C:
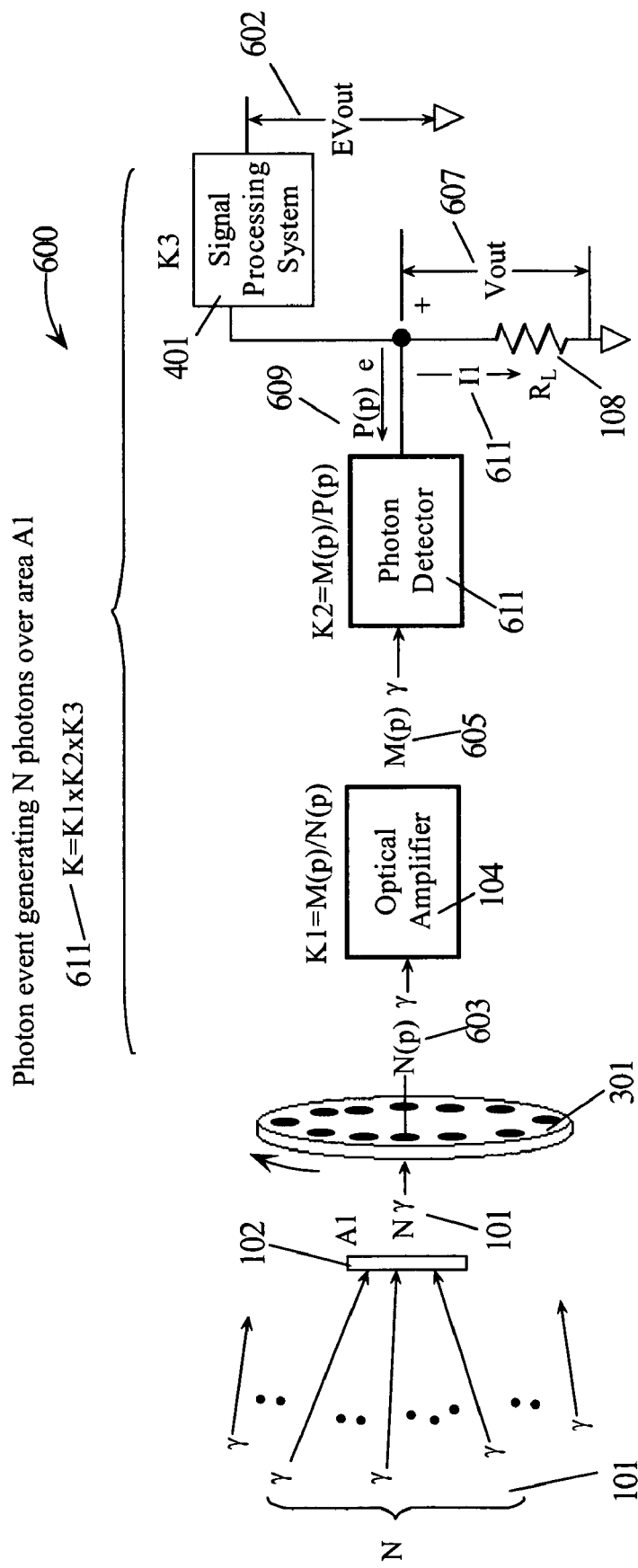
FIG. 4C is a block diagram of a system for generating a photon sensor signal according to embodiments of FIG. 4B with the addition of an optical chopping element to improve signal to noise.

FIG. 4C is a block diagram of an SPS 600 according to embodiments of the present invention wherein photon sensor signal 607 is generated as a pulsed voltage proportional to the number N(p) pulsed photons 603 generated in response to N photons 101 impinging on an area A1 102. A photon chopping device 301 is used to interrupt the N photons 101 generating the N(p) pulsed photons 603 per unit time. Optical amplifier 104 produces M(p) pulsed photons 605 per unit time. The gain K1 of optical amplifier 104 is defined as the ratio M(p)/N(p). The M(p) photons 605 per unit time are coupled to the input of a photon detector 106 that converts the pulsed input photons to pulsed output electrons. The P(p) pulsed output electrons 609 result in pulsed current I 610 that generates a photon sensor signal 607 as a pulsed output voltage when it flows through load resistor RL 108. Chopping the photon stream N 101 allows the pulsed photon sensor signal 607 to be processed to reduce background offset photons in the input and to improve signal to noise. Photon sensor signal 607 may be further processed by signal processing system 401 to produce enhanced photon sensor signal 602. Signal processing system 401 includes an additional gain factor K3. The desired system gain K representing the enhanced photon sensor signal 602 generated in response to N(p) pulsed photons 603 per unit time is partitioned into gains K1, K2 and K3. In embodiments of the present invention, the gains K1, K2 and K3 are selected to optimize the selection of the optical amplifier 104 and the photon detector 106 to provide the best trade-offs for each device based on system performance parameters. Signal processing device 401 may be an analog system or a digital signal processing system that combine frequency selectivity along with gain factor K3 to optimize enhanced photon sensor signal 602 produced in response to the N photons 101 impinging on area A1 102 per unit time.

Figure 4D:
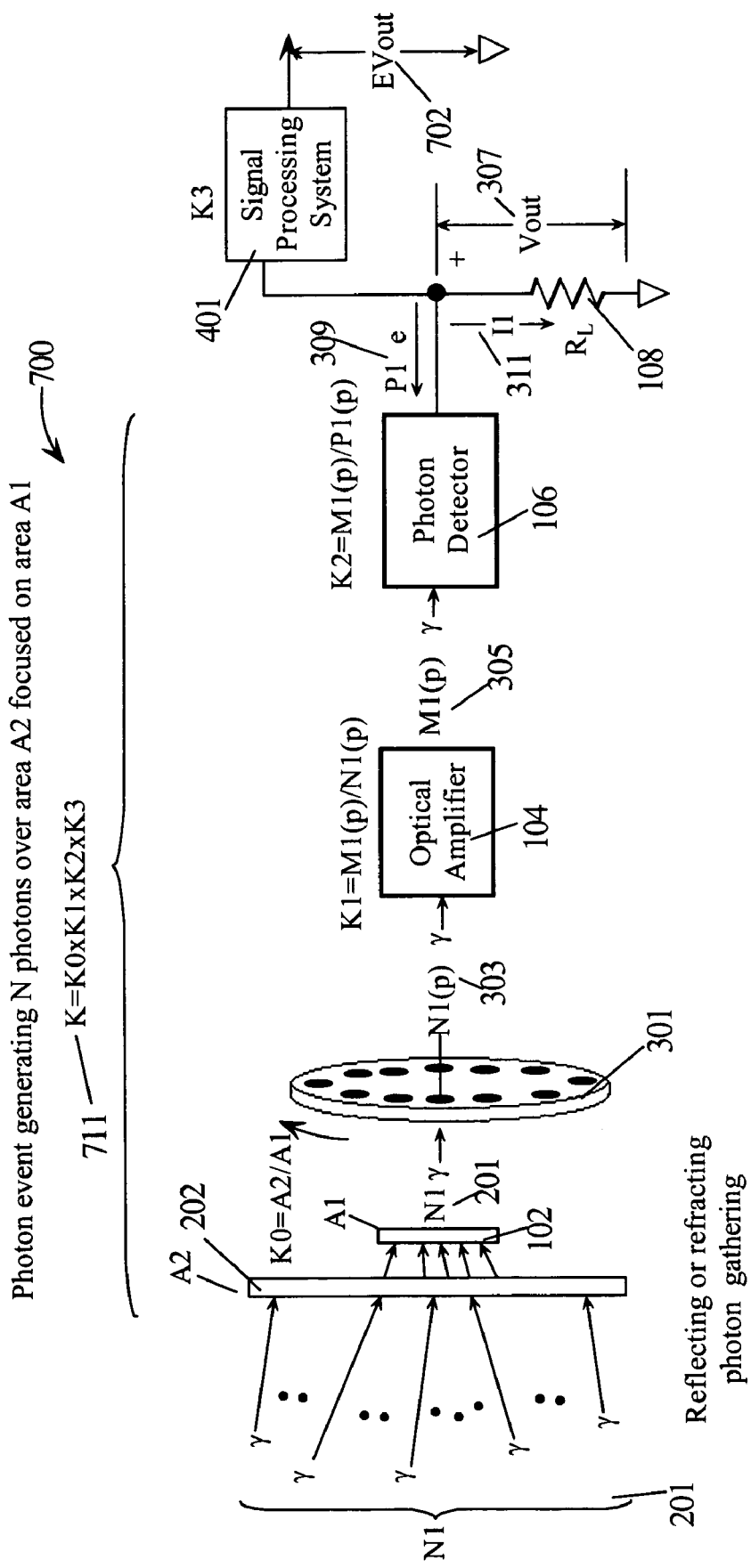
FIG. 4D is a block diagram of a system for generating a photon sensor signal according to embodiments of FIG. 3 with the addition of a signal processing system to enhance the electronic output signal.

FIG. 4D is a block diagram of an SPS 700 according to embodiments of the present invention wherein a photon collection system is used to focus N1 photons 201 per unit time impinging on area A2 202 onto area A1 102. The photon collection system has a gain K0 defined as the ratio of area A2 202 to area A1 102. Additionally, a photon chopping device 301 is used to interrupt the N1 photons 201 generating N1 (p) pulsed photons 303 per unit time. Optical amplifier 104 produces M1 (p) pulsed photons 305 per unit time. The gain K1 of optical amplifier 104 is defined as the ratio M1 (p)/N1 (p). The M1 (p) photons 305 per unit time are coupled to the input of a photon detector 106 that converts the pulsed input photons to pulsed output electrons. The pulsed P1 (p) output electrons 309 result in pulsed current I 310 that generates a pulsed photon sensor signal 307 as pulsed voltage when it flows through load resistor RL 108. Photon sensor signal 307 is further processed by signal processing system 401 to produce enhanced photon sensor signal 702. Signal processing system 401 includes an additional gain factor K3. The desired system gain K representing the enhanced photon sensor signal 702 generated in response to N1 photons 201 per unit time impinging on area A2 202 is partitioned into gains K0, K1, K2 and K3. In embodiments of the present invention, the gains K1, K2 and K3 are selected to optimize the selection of the optical amplifier 104 and the photon detector 106 to provide the best trade-offs for each device based on system performance parameters. Signal processing device 401 may be an analog system or a digital signal processing system that combine frequency selectivity along with gain factor K3 to optimize enhanced photon sensor signal 702 produced in response to the N1 photons 201 impinging on area A2 202 per unit time.

Figure 5:
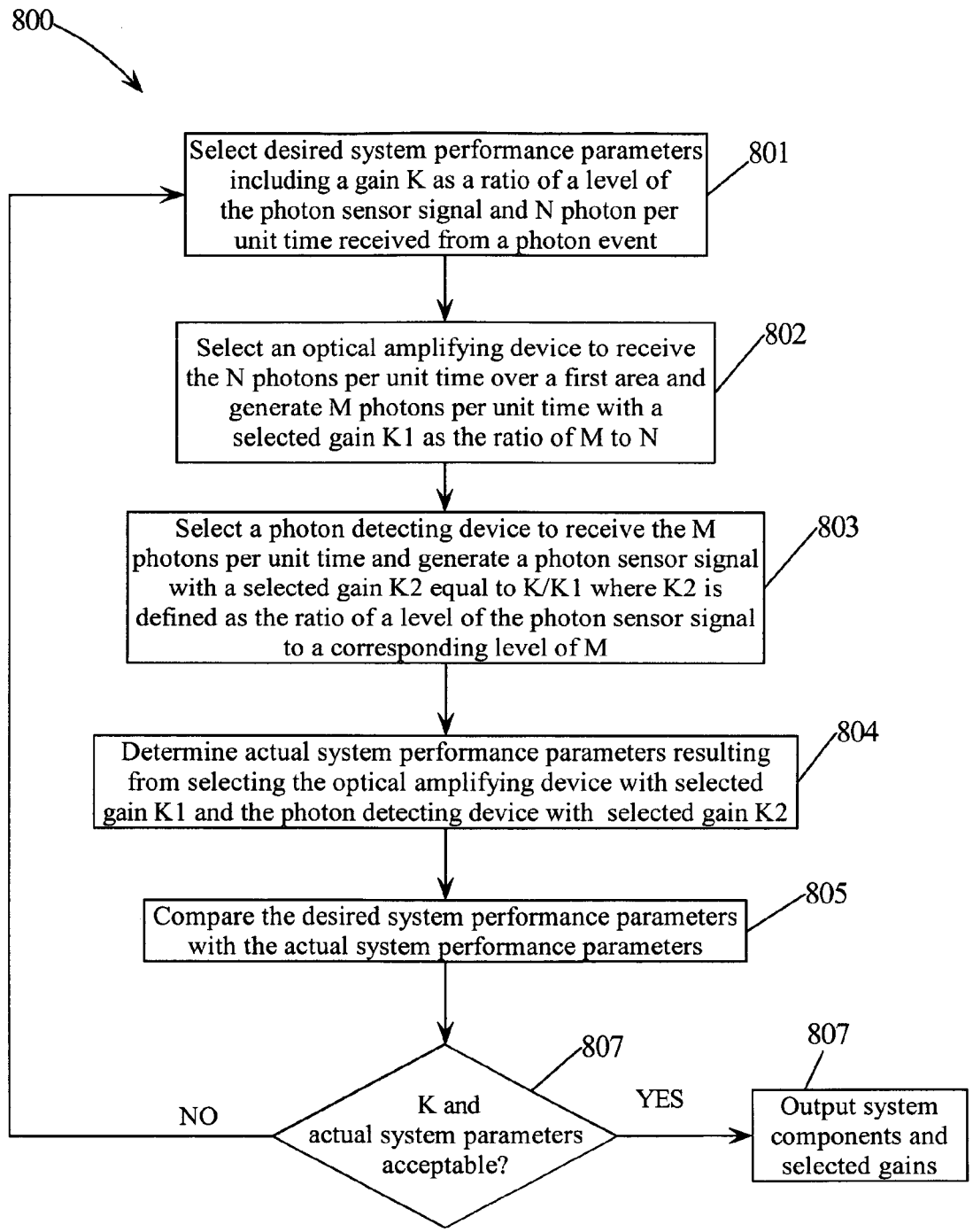
FIG. 5 is a flow diagram of method steps used to configure a system for generating a photon sensor signal according to embodiments of the present invention.

FIG. 5 is a flow diagram of method steps used in embodiments of the present invention. In step 801, desired system performance parameters including an overall system gain K are chosen where K is the ratio of a level of a photon sensor signal and a number N photons per unit time received over an area A1 from a photon event. In step 802, and optical amplifier is selected to receive the N photons per unit time over the first area and generate M photons per unit time with a selected gain K1 defined as the ratio of M to N. In step 803, a photon detector is chosen to receive the M photons per unit time and generate an number P electrons per unit time that are converted to a photon voltage. The photon voltage is further processed to produce the photon sensor signal. The photon detector has a selected gain K2 equal to K/K1 where K2 is defines as the ratio of a level of the photon sensor signal to a corresponding level of M. In step 804, actual system parameters of the components making up the photon amplifying device with selected gain K1 and the photon detector device with selected gain K2 are determined. In step 805, the desired performance parameters compared with the actual system performance parameters. In step 807, a test is done to determine if the actual or realized system performance parameters are acceptable. If the actual performance parameters are acceptable then the chosen system components are used to configure the system. If the actual performance parameters are not acceptable, then a branch may be taken back to step 801 where the selection process may be iterated wherein system components may be substituted to configure another optical amplifying device with a new selected gain K1 and to configure another photon detecting device with a new selected gain K2 equal to K/K1 thereby creating new actual system performance parameters.

Although the present invention and its advantages have been described in detail, it should be understood that various changes, substitutions and alterations can be made herein without departing from the spirit and scope of the invention as defined by the appended claims.

What is claimed is:

1. A system for generating a photon sensor signal in response to a number N photons per unit time received over a first area from a photon event comprising:
   an optical amplifying device receiving the number N input photons per unit time over the first area and generating a number M output photons per unit time with a gain K1 defined as a ratio of M to N;
   wherein the optical amplifying device further comprises a photon gathering device for collecting N1 photons over a second area and focusing the N1 photons over the first area, wherein the photon gathering device has an optical gain K0 defined as the ratio of the second area to the first area and KO is a factor of K1; and
   a photon detecting device receiving the M output photons per unit time and generating the photon sensor signal with a gain K2 defined as a ratio of a level of the photon sensor signal to a corresponding level of M, wherein the system has performance parameters including a system gain K as the product of K1 and K2.

2. The method of claim 1, wherein the optimal temperature increase period is determined by determining the fastest rate at which temperature can be increased without substantial thermal stress to the DPF.

3. The method of claim 1, wherein the increasing step is performed such that temperature increases occur over an increase period of at least seven minutes.

4. The system of claim 1, wherein the optical amplifying device further comprises an optical chopping device disposed before the first area to interrupt the N photons per unit time for a chopping duration CD each cycle of a chopping frequency FC thereby generating the photon sensor signal as a pulsed signal proportional to the N photons per unit time with the chopping frequency FC and a duration equal to (1/FC)-CD.

5. The system of claim 4, wherein the photon detection device comprises;
a photon detector converting the M photons per unit time to P electrons per unit time, wherein P electrons per unit time represents an electrical current ID; and
signal processing circuitry receiving ID and generating the photon sensor signal as a voltage.

6. The system of claim 5, wherein the signal processing circuitry comprises:
an electrical device for converting current ID to a photon voltage; and
electronic circuitry for converting the photon voltage to the photon sensor signal with a gain K3 and a bandwidth B, wherein K3 is a factor of K2.

7. The system of claim 5, wherein the signal processing circuitry includes AC amplification with gain K3 and bandwidth B where K3 is a factor of K2.

8. The system of claim 7, wherein the frequency FC of the photon chopping device is adjusted to produce a signal frequency of the photon sensor signal to optimize a signal to noise ratio when using AC amplification in the signal processing circuitry.

9. The method of claim 1, further comprising the step of decreasing the temperature at the DFP after the regeneration period, wherein the temperature decrease occurs at a rate not exceeding 27 degrees per minute.

10. The system of claim 9, wherein the optical amplifying device further comprises a photon gathering device for collecting N1 photons over a second area and focusing the N1 photons over the first area, wherein the photon gathering, device has an optical gain K0 defined as the ratio of the second area to the first area and KO is a factor of K1.

11. The method of claim 1, wherein the steps of increasing, maintaining, and decreasing the temperature occur during a temperature profile period that at least twice as long as the regeneration period.

12. The system of claim 1, wherein the optical amplifying device further comprises an optical chopping device disposed before the first area to interrupt the N photons per unit time for a chopping duration CD each cycle of a chopping frequency FC thereby generating the photon sensor signal as a pulsed signal proportional to the N photons per unit time with the chopping frequency FC and a duration equal to (1/FC)-CD.

13. The system of claim 12, wherein the photon detection device comprises;
a photon detector converting the M photons per unit time to P electrons per unit time, wherein P electrons per unit time represents an electrical current ID; and
signal processing circuitry receiving ID and generating the photon sensor signal as a voltage.

14. The system of claim 13, wherein the signal processing circuitry comprises:
an electrical device for converting current ID to a photon voltage; and
electronic circuitry for converting the photon voltage to the photon sensor signal with a gain K3 and a bandwidth B, wherein K3 is a factor of K2.

15. The system of claim 13, wherein the signal processing circuitry includes AC amplification with gain K3 and bandwidth B where K3 is a factor of K2.

16. The system of claim 15, wherein the frequency EC of the photon chopping device is adjusted to produce a signal frequency of the photon sensor signal to optimize a signal to noise ratio when using AC amplification in the signal processing circuitry.

17. The system of claim 13, wherein the signal processing circuitry only comprises analog circuitry.

18. The system of claim 13, wherein the photon voltage is digitized and the signal processing circuitry uses digital signal processing to generate the photon sensor signal.

19. The system of claim 12, wherein the photon chopping device is selected from a class of chopping devices consisting of mechanical chopping using a rotating wheel, electromechanical chopping using controlled mirror orientation, and electronically controlled crossed polarizer chopping.

20. The system of claim 1, wherein the optical amplifying device comprises optical amplifying devices employing stimulated emission with either optical or electrical pumping.

21. The system of claim 1, wherein the photon detection device has photon detectors selected from a set of photon detectors comprising avalanche photodiodes, PIN diodes, and photocathode devices.

22. The system of claim 1, wherein the photon gathering device comprises an optical lens system.

23. A method for configuring a system for generating a photon sensor signal in response to a number N photons per unit time received over a first area from a photon event comprising the steps of:
selecting first system performance parameters including a gain K as a ratio of a level of the photon sensor signal to N photons per unit time for the system;
selecting an optical amplifying device to receive the number N input photons per unit time over the first area and generate a number M output photons per unit time with a selected gain K1 defined as a ratio of M to N;
selecting a photon detecting device to receive the M output photons per unit time and generate the photon sensor signal with a selected gain K2 equal to K/K1 and defined as a ratio of a level of the photon sensor signal to a corresponding level of M;
determining second system performance parameters resulting from selecting the optical amplifying device with selected gain K1 and selecting the photon detecting device with the selected gain K2;
comparing the second system performance parameters to the first performance parameters; and
configuring the system using the optical amplifying device with the selected gain K1 and the photon detecting device with the selected gain K2 if the second system performance parameter compare to the first performance parameters within predetermined acceptable values.

24. The method of claim 23, wherein the first system performance parameters comprise a signal to noise ratio of the photon sensor signal, a size of the system, a system cost, sensitivity and offsets preventing optimum amplification.

25. The method of claim 23, wherein the optical amplifying device further comprises a photon gathering device for collecting N1 photons over a second area and focusing the N1 photons over the first area, wherein the photon gathering device has an optical gain K0 defined as the ratio of the second area to the first area and KO is a factor of K1.

26. The method of claim 25, wherein the optical amplifying device further comprises an optical chopping device disposed before the first area to interrupt the N photons per unit time for a chopping duration CD each cycle of a chopping frequency FC thereby generating the photon sensor signal as a pulsed signal proportional to the N photons per unit time with the chopping frequency FC and a duration equal to (1/FC)-CD.

27. The method of claim 26, wherein the photon detection device comprises;
   a photon detector converting the M photons per unit time to P electrons per unit time, wherein P electrons per unit time represents an electrical current ID; and
   signal processing circuitry receiving ID and generating the photon sensor signal as a voltage.

28. The method of claim 23, wherein the optical amplifying device further comprises an optical chopping device disposed before the first area to interrupt the N photons per unit time for a chopping duration CD each cycle of a chopping frequency FC thereby generating the photon sensor signal as a pulsed signal proportional to the N photons per unit time with the chopping frequency FC and a duration equal to (1/FC)-CD.

29. The method of claim 28, wherein the photon detection device comprises;
   a photon detector converting the M photons per unit time to P electrons per unit time, wherein P electrons per unit time represents an electrical current ID; and
   signal processing circuitry receiving ID and generating the photon sensor signal as a voltage.

30. The method of claim 29, wherein the signal processing circuitry comprises:
   an electrical device for converting current ID to a photon voltage; and
   electronic circuitry for converting the photon voltage to the photon sensor signal with a gain K3 and a bandwidth B, wherein K3 is a factor of K2.

31. The method of claim 23, wherein the photon detection device comprises;
   a photon detector converting the M photons per unit time to P electrons per unit time, wherein P electrons per unit time represents an electrical current ID; and
   signal processing circuitry receiving ID and generating the photon sensor signal as a voltage.

32. The method of claim 31, wherein the signal processing circuitry comprises:
   an electrical device for converting current ID to a photon voltage; and
   electronic circuitry for converting the photon voltage to the photon sensor signal with a gain K3 and a bandwidth B, wherein K3 is a factor of K2.

* * * * *